(12) United States Patent
Wakayama et al.

(10) Patent No.: US 8,675,448 B1
(45) Date of Patent: Mar. 18, 2014

(54) ADAPTIVE PING CONTROL METHOD FOR TRACK-HOLDING IN MULTI-STATIC ACTIVE SONAR NETWORKS

(75) Inventors: Cherry Y. Wakayama, San Diego, CA (US); Douglas J. Grimmett, Rosemead, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 442 days.

(21) Appl. No.: 13/155,231

(22) Filed: Jun. 7, 2011

(51) Int. Cl.
*G01S 15/00* (2006.01)

(52) U.S. Cl.
USPC .......................................................... 367/92

(58) Field of Classification Search
USPC ........................................ 367/87, 88, 92, 99
See application file for complete search history.

(56) References Cited

PUBLICATIONS

Krout IEEE journal of oceanic engineering, vol. 34, No. 4 Oct. 2009.*
Coraluppi NURC-PR-2007-004, Pisa Italy, Jun. 4-8, 2007.*
S. Coraluppi, and D. Grimmett, Multistatic Sonar Tracking, Proc. of the SPIE Conf. on Signal Processing, Sensor Fusion, and Target Recognition XII, Orlando, Florida, Apr. 2003.
D. W. Krout, M. A. Ei-Sharkawi, W. J. L. Fox, and M. U. Hazen, Intelligent Ping Sequencing for Multistatic Sonar Systems, Proc. of the 9th Intl. Conf. on Information Fusion, Florence, Italy, Jul. 2006.
A. Saksena, and I-J. Wang, Dynamic Ping Optimization for Surveillance in Multistatic Sonar Buoy Networks with Energy Constraints, Proc. of the 47th IEEE Conf. on Decision and Control, Cancun, Mexico, Dec. 2008.
D. Grimmett, Multi-Sensor Placement to Exploit Complementary Properties of Diverse Sonar Waveforms, Proc. of the 9th Intl. Conf. on Information Fusion, Florence, Italy, Jul. 2006.
D. Grimmett, S. Sullivan, Sr., and J. Alsup, Modeling Specular Occurrence in Distributed Multistatic Fields, Proc. of the IEEE Oceans'08 Conf., Kobe, Japan, Apr. 2008.
D. Grimmett, Multistatic Target Tracking using Specular Cue Initiation and Directed Data Retrieval, Proc. of the 11th Intl. Conf. on Information Fusion, Cologne, Germany, Jul. 2008.
R. J. Urick, Solving the Sonar Equations with Fluctuating Signals in Noise, Proc. of IEEE Intl. Conf. on Acoustics Speech and Signal Processing, May 1977.

* cited by examiner

*Primary Examiner* — Luke D Ratcliffe
*Assistant Examiner* — Hovhannes Baghdasaryan
(74) *Attorney, Agent, or Firm* — Ryan J. Friedl; Kyle Eppele

(57) ABSTRACT

A method includes identifying a ping forecast time window given a current set of target tracks to hold, discretizing the ping forecast time window with more than one potential ping time, calculating, given more than one ping source and ping waveform, a ping control metric for each combination of potential ping time, ping source, and ping waveform, and creating a ping command using the maximum calculated ping control metric. The ping command includes a specific ping source from the more than one ping source, a specific ping waveform from the more than one ping waveform, and a specific ping time from the more than one potential ping time. The ping control metric may be a user-defined metric that is a function of predicted signal-to-noise ratios and predicted target tracks, and may contain aspect dependent target strength and target position and velocity data for a particular potential ping time.

19 Claims, 14 Drawing Sheets

ADAPTIVE PING CONTROL METHOD FOR TRACK-HOLDING IN MULTI-STATIC ACTIVE SONAR NETWORKS

FEDERALLY-SPONSORED RESEARCH AND DEVELOPMENT

The Adaptive Ping Control Method for Track-Holding in Multi-Static Active Sonar Networks is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac T2@navy.mil; reference Navy Case Number 100980.

BACKGROUND

Distributed multi-static active sonar networks are useful for detecting various underwater objects. Ping control is one aspect of a multi-static active sonar network. A conventional approach for ping control uses a simple round-robin schedule in which a fixed sequence of source-waveform combination is repeated with a fixed ping interval. Such an approach does not consider the target state, resulting in a waste of ping energy because many pings will occur when the target is in an unfavorable detection condition.

Other ping control approaches do not consider full kinematic state estimates (positions and velocities) of the tracks selected for holding in the calculation of predicted sonar performance metric, and ping controls are generated at a fixed ping rate. These approaches may result in inferior performance in target track-holding since the true sonar performance is dependent upon full kinematic state. Further, these approaches will not be able to capture high-strength specular echo opportunities.

Accordingly, an adaptive ping control method is needed that overcomes the above drawbacks and produces a more accurate prediction of performance metric by considering the full target state estimates and evaluating the performance metrics with fine sampling intervals to allow for fine tuning of the ping time.

DETAILED DESCRIPTION OF SOME EMBODIMENTS

Figure 1:
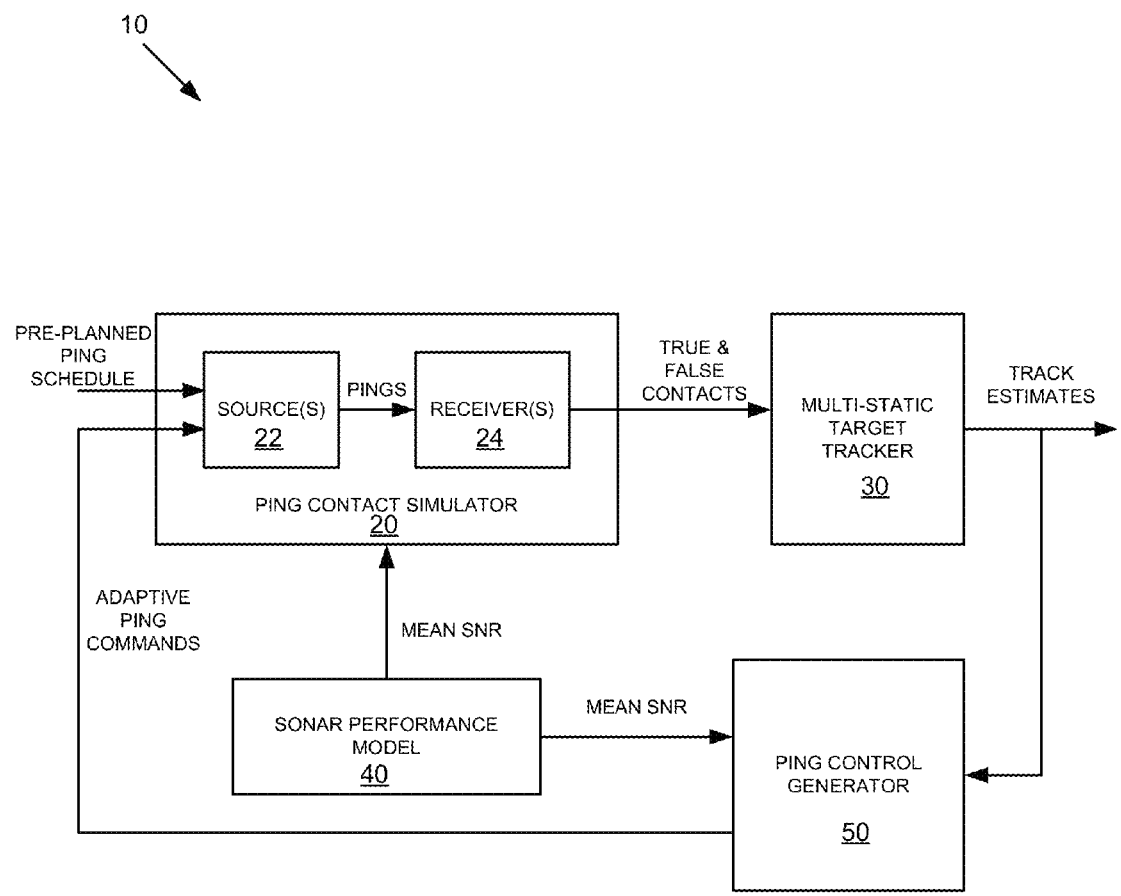
FIG. 1 shows a diagram of an embodiment of a system architecture that may be used to implement methods in accordance with the Adaptive Ping Control Method for Track-Holding in Multi-Static Active Sonar Networks.

Distributed multi-static active sonar networks have the potential to increase Anti-Submarine Warfare (ASW) performance against small, quiet, threat submarines in the harsh clutter-saturated littoral and deeper ocean environments. This improved performance comes through the expanded geometric diversity of a distributed field of sources and receivers and results in increased probability of detection, area coverage, target tracking, classification, and localization. However, given the variability in environmental (acoustic) conditions, sonar node performance (as a function of location, time, and other parameters), and threat target behavior, such networks will not exploit their full potential without intelligent management and control methods. Adaptive sonar control techniques and tactical decision aides may be applied to best address the following questions: Where?, Which?, What?, When?, and How?

The Where question is addressed through multi-static sensor placement algorithms. The How question is addressed by adaptive signal and information processing algorithms. The Which, What, and When are applicable to sonar ping control algorithms as explained below.

Which source(s) to transmit: The attempt is to optimally choose which source or sources of all those in the field are best to ping next, given the objectives and current status of the ASW mission being executed. Current methods typically employ a regular, cyclic, pre-planned ping transmission schedule, which is often arbitrarily determined and not specially optimized for achieving the ASW objective. An adaptive solution will attempt to increase ASW coverage, as well as consider other factors such as field persistence and energy constraints.

What waveform(s) to transmit: Given environmental conditions, sonar geometry, and target behavior, an optimum selection of transmission waveform may be made. Center frequency, bandwidth, and pulse duration are important signal characteristics which may be controlled and optimized for the multi-static field; sonar performance modeling will enable an optimization algorithm to make the best selection. An important element of this is the choice between Doppler-sensitive (e.g. CW) and Doppler-insensitive (i.e. F.M.) waveforms. It has been shown that these waveform types provide complementary performance within a multi-static field, and therefore their selection should be made in an intelligent, optimized way.

When to transmit the source: This may address the operational persistence of the field, by intelligently selecting ping times to preserve sources' energy stores. It may also provide fine-tuned ping timing commands, which attempt to capture targets while in (relatively rare) specular target geometries. Targets ensonified while in the specular (beam aspect) geometry produce very loud (more than one order of magnitude greater) detection echoes. Specular echoes have demonstrated extreme value in multi-static data fusion, tracking, and classification algorithms. Adaptive ping control may attempt to capture such opportunities through precise ping timing without which, they would otherwise be missed.

In considering adaptive ping control, it is important to understand the possible ASW objectives, or mission modes of operation under which it may be applied. Typical operations can be grouped into the following mission modes: target search mode, track-holding mode, and search and hold mode.

Target Search Mode: In this mode, the surveillance operation is focused on optimizing performance in detecting targets and initiating tracks on these detections. The objective is to detect the (unknown number of) targets in a surveillance area. This applies to monitoring a surveillance barrier for penetration, or wide area search and clearing (sanitization) missions.

Track-Holding Mode: In this mode, the operation is focused on holding tracks and maintaining good localization estimates for targets which have already been detected. Here, it is assumed that highly probable threat(s) have been detected, with confirmed tracks initiated, and the objective is to do everything possible not to lose these targets. This objective is important to enable target contact confirmation and classification and to provide localization cueing solutions to other sensors or sensor networks. Track-holding mode can also contribute to targeting solutions for effective prosecution.

Search and Hold Mode: This mode attempts to perform the previous two modes in parallel. An optimization solution would need to consider both objectives, which may or may not be competing, within the solution space.

The subject matter disclosed herein describes an automatic, adaptive ping control optimization method that is designed to address the "track-hold" operation. The method provides a comprehensive control solution to all three of the ping management questions in parallel: which source to ping, what waveform type (Doppler sensitive continuous wave (CW) or Doppler-insensitive frequency-modulated wave (FM)) to use, and when to ping in order to capture high-strength specular detection echoes. The approach is unique in that it considers both sonar performance prediction modeling and fused multi-static tracker outputs in a closed-loop control structure. The ping control commands are generated by the control generator, which takes inputs from a sonar performance model as well as the output tracks of a multi-static tracker.

The adaptive ping control architecture is based on principles of feedback control of dynamical systems with uncertainty parameters. In this architecture, the target information is obtained by sensor measurements and processed by the tracker and the control generator, and the processed information is then fed back to the sensor network for improved tracking. A diagram of the adaptive ping control architecture is shown in FIG. 1. As shown in FIG. 1, architecture 10 includes four main modules: ping contact simulator 20, multi-static target tracker 30, sonar performance model 40, and ping control generator 50.

Ping contact simulator 20 generates contacts which represent true (target-originated) and false echo detections (false alarms) at each receiver for each processed sonar ping. Multi-static target tracker 30 computes current and future state estimates based on sensor data and target and measurement uncertainties and produces tracks. Sonar performance model (SPM) 40 computes mean signal-to-noise ratios (SNR) for given field configurations, consisting of sources, receivers and targets. Ping control generator 50 generates ping commands, as a function of the predictions (future state estimates) of multi-static target tracker 30, control parameters, and predictions from SPM 40.

Ping Contact Simulator

Ping contact simulator 20 is used to test and evaluate the ping control algorithm. Simulator 20 may include one or more sources 22 for generating pings and one or more receivers 24 for receiving detections from the generated pings. Simulator 20 provides contact (scan) files for each receiver 24, given a waveform transmission from a particular acoustic source 22 at a particular ping time. The modeled contacts consist of both target-originated contacts and false alarm contacts. The resulting scan files may be input into multi-static target tracker 30. Simulator 20 may be driven by the adaptive ping control algorithm or by a pre-planned ping schedule (which may be done to provide a comparison baseline).

Each contact may contain the following information: source and receiver identification, waveform type, ping time, SNR, bearing, arrival time (for ranging), and range-rate (if CW). Target contacts are derived from a manufactured scenario of target truth trajectories. The target contacts are modeled by obtaining a mean SNR from sonar performance model 40, and adding a random fluctuation term drawn from a Gaussian distribution (nominally 0 mean and 5 dB standard deviation), along with assumed measurement (bearing, time, and range-rate) errors. A number of false alarm contacts (nominally 50) are generated for each sonar scan, with a uniform distribution in time-bearing measurement space, and a Gaussian distribution for bi-static range-rate. As an example, a false contact SNR may be modeled assuming a Gaussian distribution (nominally 12 dB mean and 5 dB standard deviation).

Multi-Static Target Tracker

Multi-static target tracker 30 associates measurement contacts to existing tracks and generates track state estimates. Tracker 30 may comprise, for example, a centralized, Kalman Filter tracker. The input to tracker 30 is a series of contact files (measurement scans), unique to each source-receiver-waveform and time of ping transmission provided by ping contact simulator 20. Target motion is modeled using a 2-dimensional nearly constant velocity motion model. Converted, de-biased positional measurements may be used together with range-rate measurements in an extended Kalman Filter (EKF). A logic-based track initiation (M/N) and termination (K) scheme may also be used. Further, nearest neighbor data association may be used, with a 2-dimensional or 3-dimensional (if Doppler measurements are available) ellipsoidal association gate. Track state estimates at the next potential ping transmission times for the track-set selected for holding are provided to ping control generator 50. Those tracks may be selected according to classification track scores which may be based on kinematic correlations, track lengths, prior information, etc.

Sonar Performance Model

SPM 40 provides mean levels of SNR, which are used by ping control generator 50. Accurate modeling of sonar system performance is non-trivial, given the complexity and uncertain knowledge of the underwater acoustic environment. As an example, a bi-static sonar performance model may be used. In other embodiments, higher fidelity acoustic sub-models may be incorporated into the approach, as needed. A wholly reverberation limited shallow water environment is assumed, being dominated by sea bottom reflections. Transmission losses to/from the target and the bottom underneath it are assumed equivalent. CW and FM waveforms are modeled using their respective Q-functions (descriptions of their performance against reverberation). Aspect-dependent target strength is modeled, and includes high-strength echoes when the target is in the specular condition. The specular geometric condition occurs when the angles from the target to the source and receiver are equal (fore and aft, or, aft and fore) from the target's beam angle (+/−90 degrees from the target's heading). Levels of mean SNR for a single ping received by the entire field are output, given bi-static source-receiver geometries, assumed target speeds and headings, and other parameters.

Ping Control Generator

Figure 2:
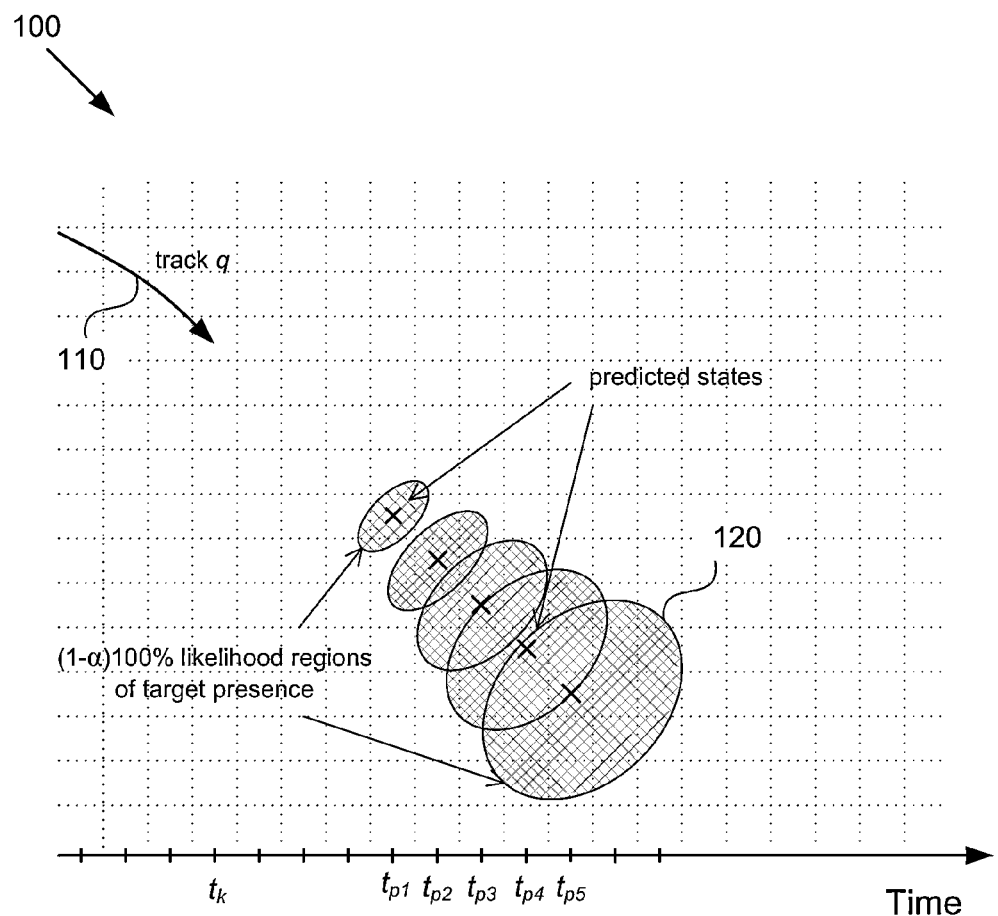
FIG. 2 shows a diagram illustrating predicted target states and (1−α)100% target likelihood regions with 0<α<1 in accordance with the Adaptive Ping Control Method for Track-Holding in Multi-Static Active Sonar Networks.

Ping control generator 50 uses future state estimates of the tracks for holding from multi-static target tracker 30, mean SNRs from SPM 40, and control objectives, to derive an optimal ping command that includes source, waveform, and ping time selection. In this disclosure, only the track-holding scenario is considered, where confirmed tracks have already been established and the tracks for holding have been identified by multi-static target tracker 30. The objective of control generator 50 is to maximize the average instantaneous detection probability of the tracks at the input and output of target tracker 30 for effective holding of the targets. The strategy is to focus on regions of the state space with higher likelihood of future target presence and maximize the target detection probability by intelligent ping management. This approach is illustrated in FIG. 2, which depicts a graph 100 of a track q and multiple predicted states 120 at different locations with respect to potential ping time. Predicted states 120 represent $(1-\alpha)100\%$ likelihood regions of target presence.

Variable Ping Interval

Figure 3:
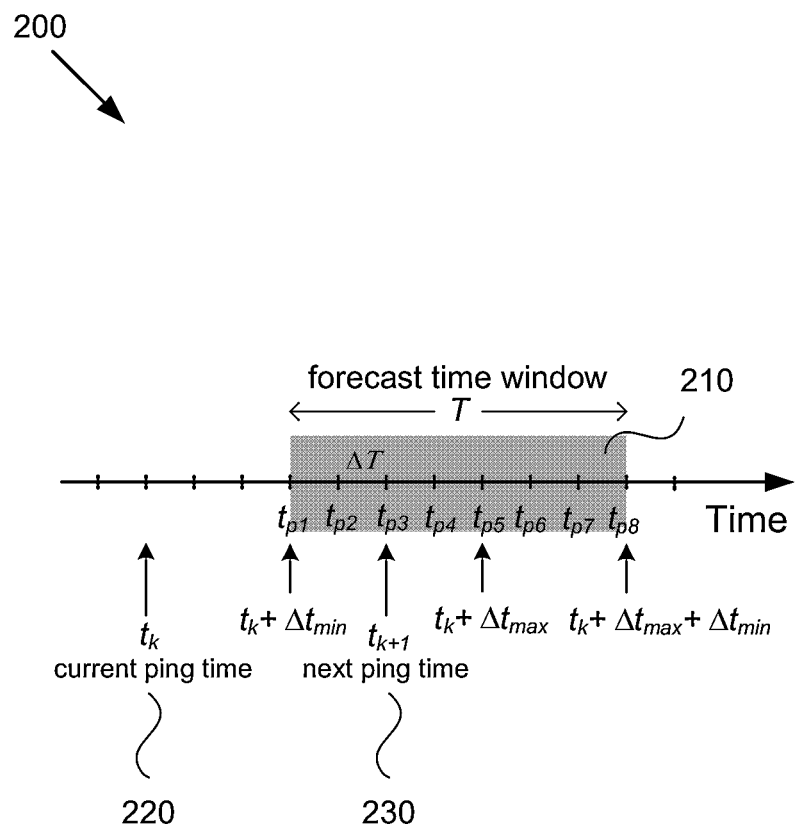
FIG. 3 shows a diagram illustrating a variable ping interval in accordance with the Adaptive Ping Control Method for Track-Holding in Multi-Static Active Sonar Networks.

Referring to FIG. 3, FIG. 3 shows diagram 200 illustrating a variable ping interval. The model may use a forecast time window 210 of width T with time increment $\Delta T$ and the forecast ping time $t_p \in \{t_k+\Delta t_{min}, t_k+\Delta t_{min}+\Delta T, \ldots, t_k+\Delta t_{min}+T\}$. The current ping time 220 is denoted by $t_k$. The minimum and maximum ping intervals may be defined as $\Delta t_{min}$ and $\Delta t_{max}$. The next ping time 230, $t_{k+1}$, is selected from the set $\{t_k+\Delta t_{min}, t_k+\Delta t_{min}+\Delta T, \ldots, t_k+\Delta tmin+\Delta tmax$. The forecast ping time is considered up to the time $\Delta t_{max}+\Delta t_{min}$ from the current ping time 220 because there is a minimum lock-out period $\Delta t_{min}$ required before generating the next ping to wait for sonar ping returns and to conserve available energy of the sources.

If the best ping time, $t_p^*$, is predicted to fall between $\Delta t_{min}$ and $t_k+\Delta t_{max}$, the next ping time 230 is set to $t_p^*$. If $t_p^*$ falls between $t_k+\Delta t_{max}$ and $t_k+\Delta t_{max}+\Delta t_{min}$, we select the best next ping time, $t_{k+1}$, from the set $\{t_k+\Delta t_{min}, t_k+t_{min} \Delta T, \ldots, t_k+t_p^*-\Delta t_{min}\}$. The variable ping interval mechanism allows for the fine tuning of the ping time in order to increase the opportunity of capturing the specular geometric condition, which occurs fleetingly. Although the specular geometry is rare, when this configuration occurs, it yields a very high strength target echo relative to other geometries and should be exploited when such an opportunity is expected.

Track Forecast

For each forecast ping time, $t_p$, the optimal estimate (under linear Gaussian assumptions of Kalman filtering) of the target state for track q and its covariance matrix are predicted by the multi-static target tracker as $$X^q(p|k) = \Phi(t_p-t_k)X^q(k|k), \quad \text{(Eq. 1)}$$

$$P^q(p|k) = \Phi(t_p-t_k)P^q(p|k)\Phi^T(t_p-t_k) + Q(t_p-t_k), \quad \text{(Eq. 2)}$$

where $X^q(k|k) = [x(t_k), y(t_k), \dot{x}(t_k), \dot{y}(t_k)]^T$ is the state estimate (position and velocity in the Cartesian coordinate system) for track q at time $t_k$ and $P^q(k|k)$ is its error covariance matrix, $\Phi(t_p-t_k)$ is the discrete-time state transition matrix from time $t_k$ to $t_p$, and $Q(t_p-t_k)$ is the covariance matrix associated with the zero-mean white Gaussian noise process for a nearly constant velocity target motion model. $X^q(p|k)$ is the linear optimal predicted state for track q at time $t_p$ and $P^q(p|k)$ is the error covariance matrix associated with $X^q(p|k)$.

Discretization of Likelihood Region

At each forecast ping time, the likelihood region of target state for track q is described by a 4-dimensional (4-D) hyper-ellipsoid which is defined by the mean estimate $X^q(p|k)$, eigenvalues and eigenvectors of the covariance matrix $P^q(p|k)$ and a pre-specified confidence level. In order to characterize the target state within the hyper-ellipsoid, the ellipsoid is discretized into a 4-D grid $\{X_i^q = (x_i^q, y_i^q, \dot{x}_i^q, \dot{y}_i^q), i=1, \ldots, N_p^q\}$, where $N_p^q$, represents the total number of grid cells in the hyper-ellipsoid at time $t_p$ for track q. In our examples, we use a 90% likelihood region at each forecast ping time which corresponds to $\alpha=0.1$. The contour delineating the likelihood region with constant probability $\alpha$ about $X^q(p|k)$ is given by the value of a chi-square random variable z with 4 degrees of freedom, which satisfies the equation $$P(z \leq \chi_4^2(\alpha)) = 1-\alpha. \quad \text{(Eq. 3)}$$

Performance Metric

To perform optimum track-holding, we choose a ping command, $u_p$ (source, waveform, ping time), that maximizes the performance metric. The performance metric describes the weighted average instantaneous probability of detection for the track set selected for holding. The performance metric associated with each track at each receiver for each possible ping command is described by $$h^q(u_p, R_j) = P_A(u_p) \cdot \Sigma_{i=1}^{N_p^q}(P_D(X_i^q(u_p), R_j) \cdot P_T(X_i^q(u_p))), \quad \text{(Eq. 4)}$$

where $h^q(u_p, R_j)$ represents the probability that track q will be detected by receiver $R_j$ and the tracker will associate the detection by receiver $R_j$ to track q if ping command $u_p$ is activated. $P_T(X_i^q(u_p))$ describes the probability that the target state is $Z_i^q$ at ping time $t_p$ corresponding to ping command $u_p$ for track q. $P_D(X_i^q(u_p), R_j)$ is the probability of detection at the tracker input corresponding to receiver $R_j$ if the target state is $X_i^q$ and ping command $u_p$ is activated. $P_A(u_p)$ is the probability of tracker association of a target-originated detection if ping command $u_p$ is activated for a given false alarm rate. The mathematical description of each probability term in Eq. (4) is given below.

Probability of target state ($P_T$): The density function for the target state $X_i^q$ at $t_p$ for track q is given by the quadra-variate normal distribution with mean vector $\mu^q = X^q(p|k)$ and covariance matrix $\Sigma^q = P^q(p|k)$ as $$f(X_i^q) = \frac{1}{(2\pi)^2\sqrt{|\Sigma^q|}} \exp\left[-\frac{1}{2}(X_i^q-\mu^q)^T \sum{}^{q-1}(X_i^q-\mu^q)\right]. \quad \text{(Eq. 5)}$$

The probability of the target presence at each discretized state, $P_T(X_i^q)$, is obtained by integrating the density function over the 4-D grid cell volume.

Tracker detection probability ($P_D$): For each target state $X_i^q$, the corresponding mean SNR for each source-receiver-waveform triple is computed using SPM 40. The mean signal excess, $\overline{SE}$ (in dB), is computed as the difference between the mean SNR and the tracker classifier threshold (TH). The signal excess fluctuations are modeled by a normal distribution function, with standard deviation $\sigma_{SE}$ of about its mean $\overline{SE}$. The relationship between signal excess and detection probability for the normal fluctuation model is described in a publication by R. J. Urick, entitled "Solving the Sonar Equations with Fluctuating Signals in Noise," *Proc. Of IEEE Intl. Conf on Acoustics Speech and Signal Processing*, May 1977. The detection probability is approximated by a simpler expression as $$P_D(X_i^q(u_p), R_j) = \frac{1}{2}\left(1 + \text{erf}\left(\frac{\overline{SE}(X_i^q(u_p), R_j)}{\sqrt{2}\,\sigma_{SE}}\right)\right). \quad \text{(Eq. 6)}$$

Tracker association probability ($P_A$): After each ping time, multiple contacts are generated at each receiver, the collection of which are called a scan, due to a given false alarm rate. For each scan, a validation gate, which corresponds to a statistical region with a prescribed probability, centered around the predicted measurement of the track is set up to select the correct measurement from the target probabilistically. The volume of validation gate is computed at each forecast time, since the validation gate gets larger and the number of false alarms in the validation ellipsoid increases as the forecast ping interval increases. In order to account for increased data association uncertainty at later forecast times, the track association probability is included in the optimization criteria.

The following assumptions are made to simplify the computation of $P_A$: (1) the false alarm rate is constant at each scan, (2) false alarms are distributed uniformly in the measurement volume $V^T$ defined by the bi-static ellipse formed by the source and receiver pair in consideration and the listening-time parameter, (3) any measurement within the validation gate can be associated by the tracker with equal probability, and (4) there is one target-originated detection in the validation gate.

Let V denote volume of the validation ellipsoid in the measurement space ($R^2$ for FM and $R^3$ for CW). The total number of false alarms per scan is denoted by $N_{fa}$. The superscripts fm or cw denote an FM or CW waveform, respectively. The tracker association probability for an FM source is approximated by $$P_A^{fm} = \frac{1}{1 + N_{fa}^{fm} \cdot \frac{V^{fm}}{V^T}}. \quad \text{(Eq. 7)}$$

For a CW source, the bi-static range rate of false alarms, denoted by f, is modeled by a normal distribution with density $\tilde{f}(\tilde{r})$ and it is approximated that the false alarm range rate is independent of positional measurements. The tracker association probability for a CW source is approximated by $$P_A^{cw} = \frac{1}{1 + F \cdot N_{fa}^{cw} \cdot \frac{V^{cw}}{V^T}}, \quad \text{(Eq. 8)}$$

where $$F = \int_{\tilde{r}-c}^{\tilde{r}+c} \tilde{f}(\tilde{r})d\tilde{r}, \quad \text{(Eq. 9)}$$

$\tilde{r}$ is the expected value of target range rate and c is the length of semi-axis of the validation gate corresponding to the bi-static range rate.

Objective Function

The objective of the control generator is to choose the next ping command $u_p$ (source, waveform, ping time) that maximizes the tracker's detection performance metric of the track set selected for holding. More specifically, the control generator maximizes the specular detection opportunity by evaluating the performance metrics at variable ping intervals and choosing the best ping time in addition to choosing source and waveform. This optimization strategy is referred to as maximum specular detection probability strategy. The evaluation of the objective function is described below.

For a single selected track for holding, the performance metric associated with each track at each receiver for each possible ping command $P^q(p|k)$ is computed as described previously. The maximum is selected amongst all receivers for each possible ping command. For the case of multiple selected tracks for holding, each maximum over all receivers with respect to each selected track for each possible ping command is obtained, the weighting parameter for each selected track is computed and the maximum is selected based on the weighted average sum over all the selected tracks. The ping command with the maximum performance metric is chosen. The objective function is given by $$\max_{u_p} \Sigma_{q=1}^{N_T} \beta_k^q \cdot H^q(u_p) \quad \text{(Eq. 10)}$$

where $$H^q(u_p) = \max_{R_j} h_q(u_p, R_j), \quad \text{(Eq. 11)}$$

$N^T$ is the number of tracks selected for holding and $\beta_k^q$ is the weighting parameter for track q at current time $t_k$. The weighting parameter $\beta_k^q$ is computed as $$\beta_k^q = L_k^q \cdot \left(1 - \frac{\overline{d}_k^q}{\Sigma_j^{N_T} \overline{d}_k^j}\right), \quad \text{(Eq. 12)}$$

where $L_k^q$ represents the length of track q at current time $t_k$ and $\overline{d}_k^q$ represents the normalized, averaged norm of the residual of track q at time $t_k$. In Eq. 11, the maximum total detection probability resulting from all receivers is chosen in order to emphasize the specular geometric opportunity. Alternatively, the average value over all or a set of receivers could be chosen, if cross-fixing is considered in the tracker.

Simulation

The use of different waveforms within a geographically distributed multi-static network offers diversity in target tracking opportunities. Targets traveling with a heading along (or tangential to) the bi-static equitime ellipses present a specular condition with a large enhancement of target strength, but a zero-Doppler shift to the source-receiver pair. On the other hand, targets traveling with a heading orthogonal to the ellipses present the maximum target Doppler shift to the source-receiver pair, but a relatively low target strength. This section demonstrates the exploitation of waveform and geometric diversity for tracking by adaptive ping control which includes source, waveform, and ping time selection. Two simulation examples with two sources, one receiver and one target track are presented. The first example is simulated without any false alarm. The second example is simulated with 50 false alarms per scan.

Example 1

No False Alarm

Figure 4:
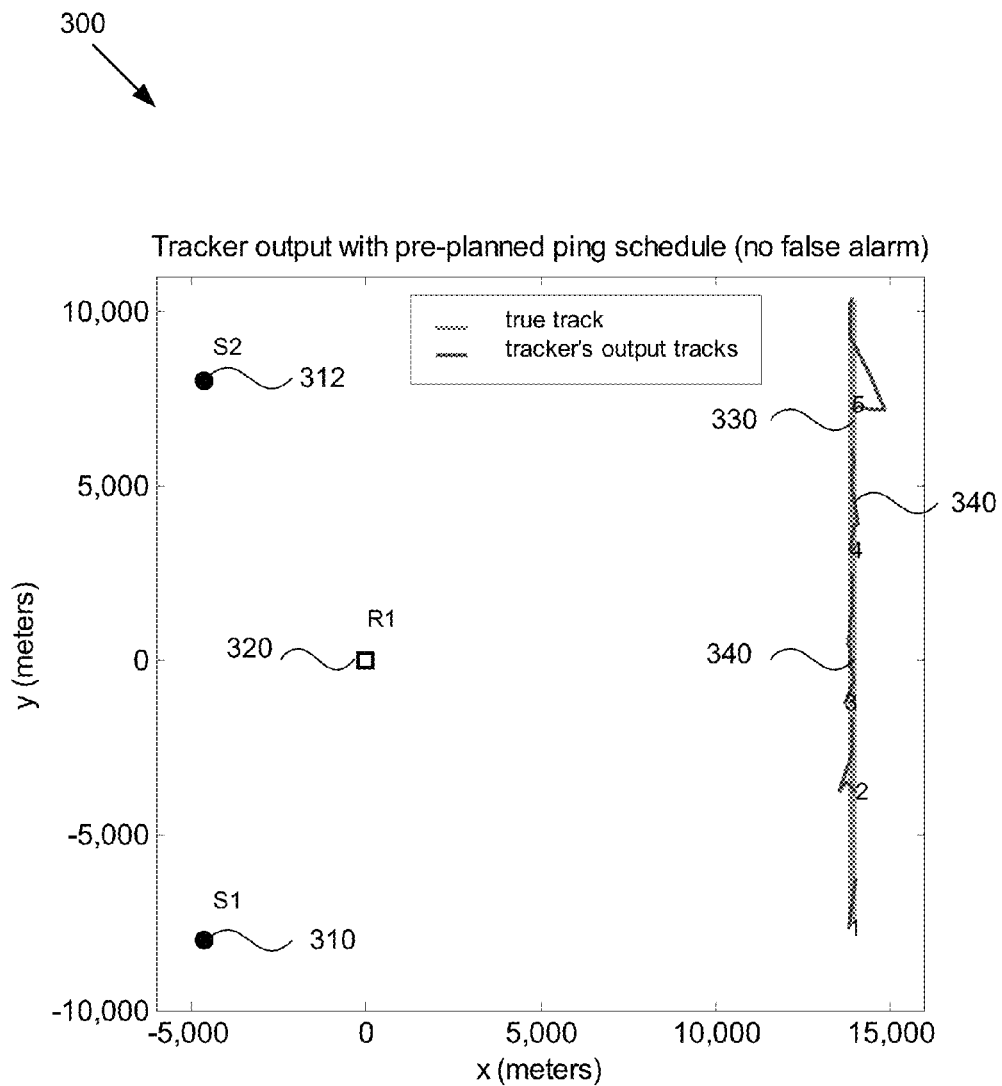
FIG. 4 shows a graph depicting simulated tracking results using a pre-planned ping schedule and no false alarms.
Figure 5:
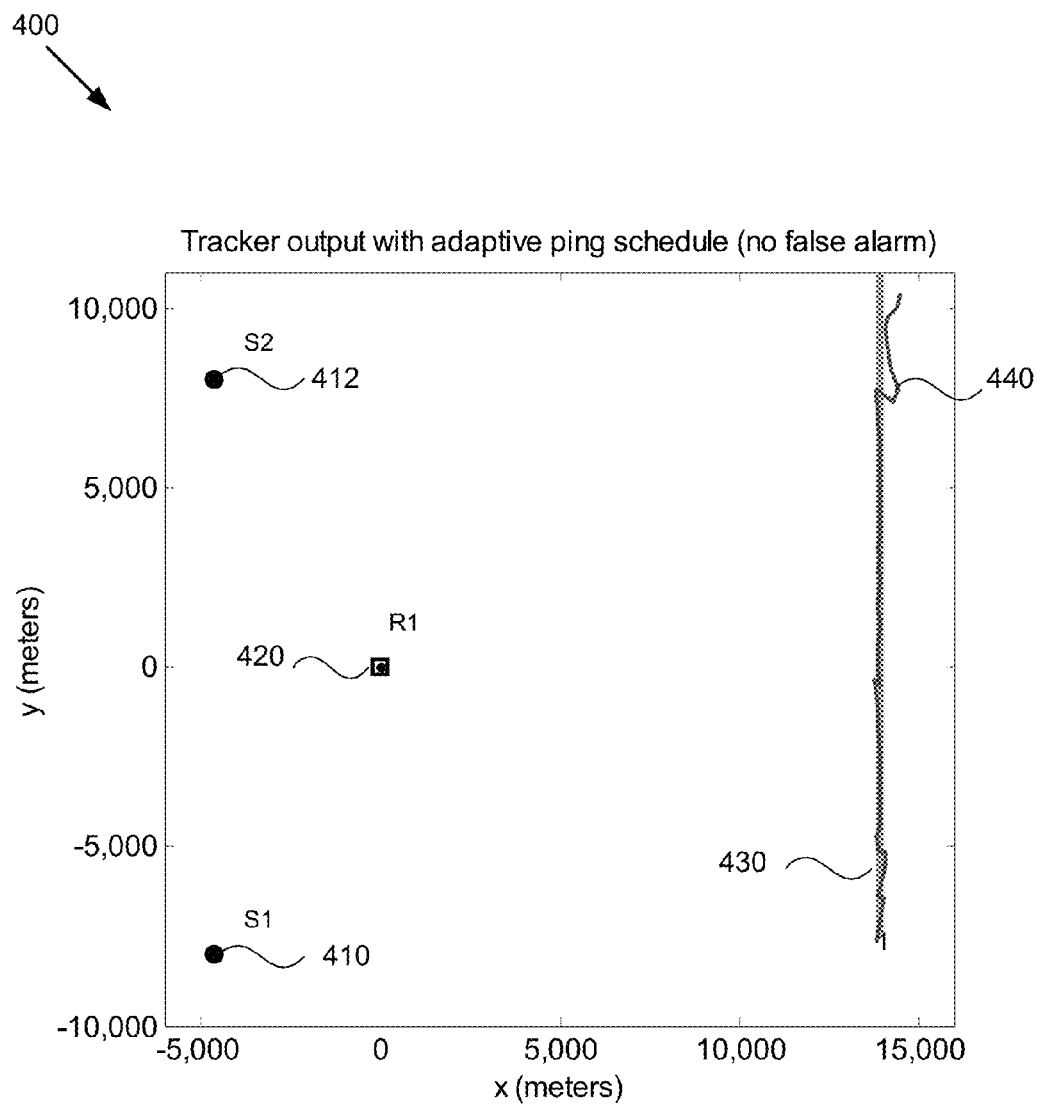
FIG. 5 shows a graph depicting simulated tracking results using an adaptive ping schedule and no false alarms, in accordance with the Adaptive Ping Control Method for Track-Holding in Multi-Static Active Sonar Networks.

Referring to FIGS. 4 and 5, FIG. 4 shows a graph 300 depicting simulated tracking results using a pre-planned ping schedule, while FIG. 5 shows a graph 400 depicting simulated tracking results using an adaptive ping schedule. In FIG. 4, there are two sources 310 and 312 and one receiver 320, whose positions are stationary. In FIG. 5, there are two sources 410 and 412 and one receiver 420, whose positions are stationary. In both FIGS. 4 and 5, a target of interest is heading north with a constant speed of 5 knots, as shown by true track 330 in FIG. 4 and 430 in FIG. 5. The input parameters for the tracker are as follows: M=2, N=4 for track confirmation, K=3 for track termination, validation gate value of 99%, tracker threshold TH=10 dB, maneuverability index of 0.01 m$^2$/s$^3$, error of receiver bearing of 2 degrees, error of receiver timing of 0.02 seconds, error of bi-static range rate of 0.1 m/s, and the SE standard deviation $\sigma_{SE}$=5 dB. The pre-planned schedule of FIG. 4 is given by a simple round-robin scheme in which each ping is generated from the source and waveform combination of {(S1,FM),(S2,FM),(S1,CW),(S2,CW)} with a constant ping interval of 60 seconds.

The pre-planned schedule example of FIG. 4 results in fragmented target tracks 340. The adaptive schedule scheme of FIG. 5 is initiated with the pre-planned schedule until there is a confirmed track. The minimum and maximum ping intervals for the adaptive scheme are set to 50 seconds and 100 seconds, respectively, with a 10 second increment. The adaptive schedule scheme not only continuously holds the target to provide a track 440 without fragmentation, but provides higher detection SNRs to the tracker.

Figure 6:
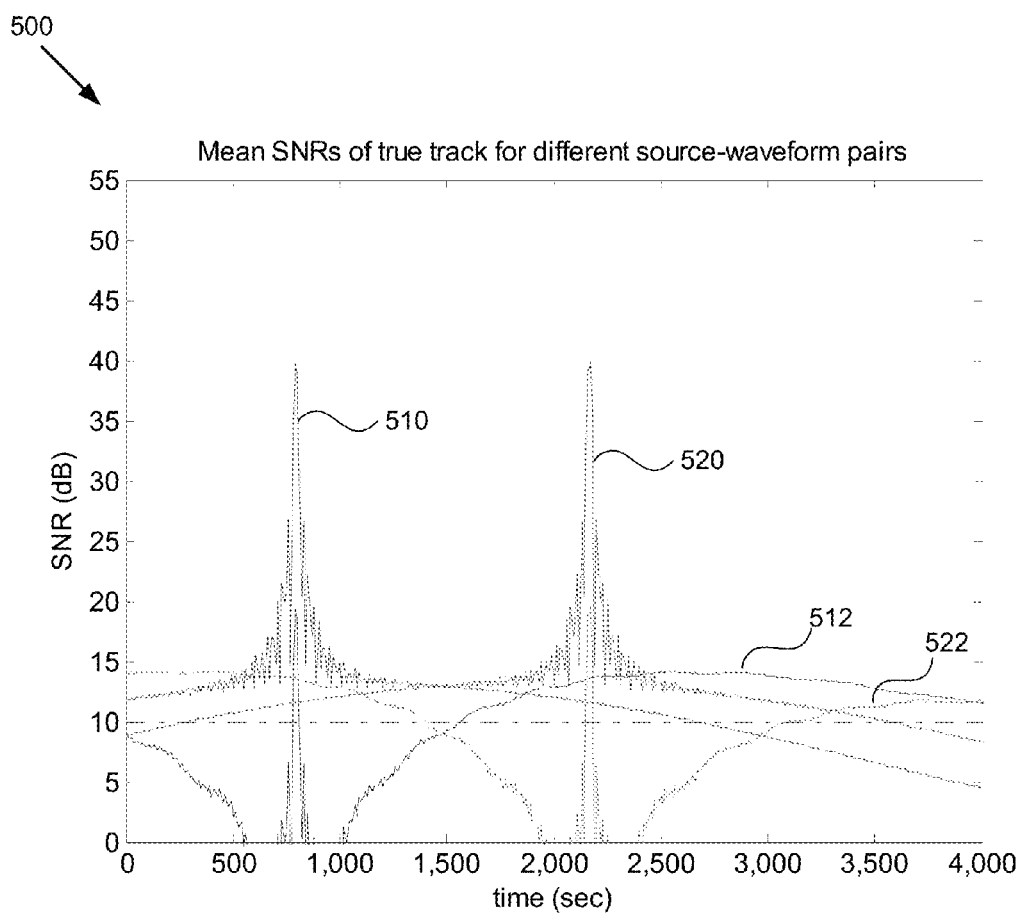
FIG. 6 shows a graph illustrating mean signal-to-noise ratios of a simulated target track at the receiver generated by two sources and two waveform combinations, in accordance with the Adaptive Ping Control Method for Track-Holding in Multi-Static Active Sonar Networks.

FIG. 6 shows a graph 500 illustrating mean SNR levels (prior to the addition of SE fluctuations) of the simulated true target track at the receiver generated by two sources and a waveform combination. Two specular opportunities are shown in FIG. 6. The first specular opportunity 510 occurs with Source 1-FM combination at about 790 sec and the second specular opportunity 520 occurs with Source 2-FM combination at about 2170 sec. Away from the specular, the continuous waveform, represented by reference numbers 512 and 522, provide better echo strengths. The adaptive ping algorithm discussed herein is configured to automatically exploit these trends.

Figure 7:
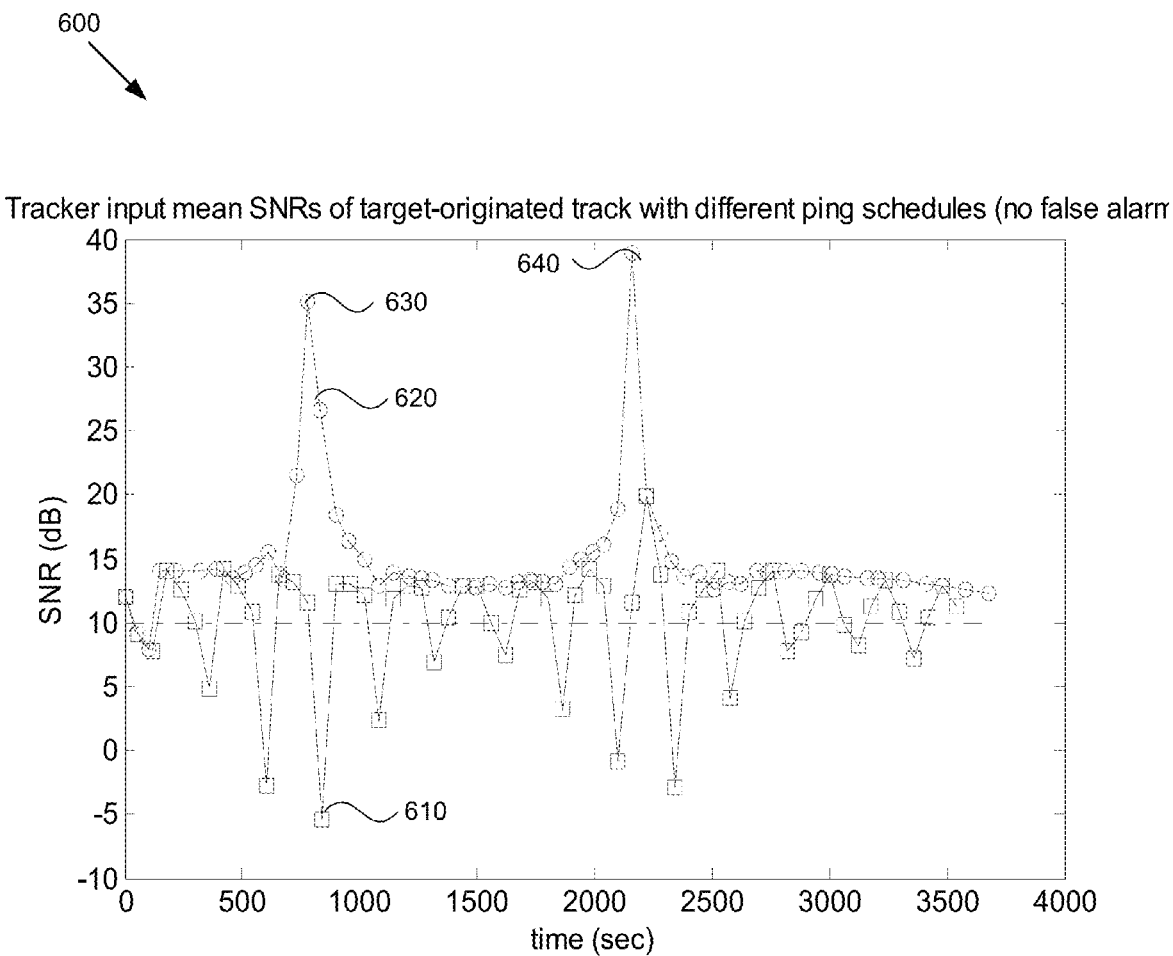
FIG. 7 shows a graph illustrating a comparison of the tracker input mean signal-to-noise ratios resulting from a pre-planned ping schedule and the adaptive ping schedule.
Figure 8:
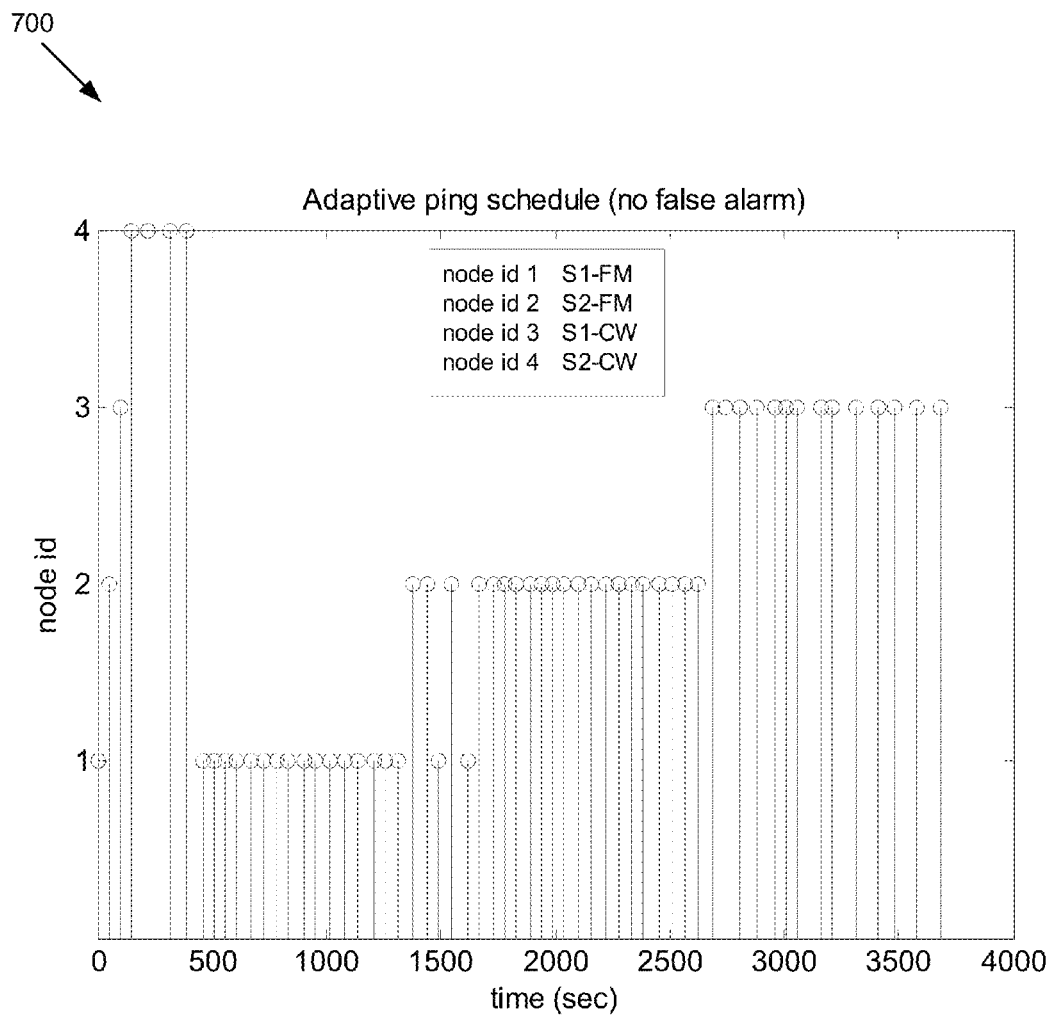
FIG. 8 shows a graph illustrating an adaptive ping schedule for a no false alarm case, in accordance with the Adaptive Ping Control Method for Track-Holding in Multi-Static Active Sonar Networks.

FIG. 7 shows a graph 600 illustrating a comparison of the tracker input mean SNR resulting from a pre-planned ping schedule 610 and the adaptive ping schedule 620. As shown, the adaptive ping schedule 620 captures both specular events close to their peak values represented by reference numbers 630 and 640, whereas the pre-planned ping schedule 610 only partially captures the second specular event at a slightly above nominal value. In addition, the average increase in mean SNR is about 4.7 dB for the case involving adaptive ping schedule 620. The resulting adaptive ping schedule is shown in graph 700 of FIG. 8.

Graph 700 illustrates different combinations of waveform and source selected as a function of ping time. As expected, the FM waveform is more often selected during the middle of the run, including the period when the specular detections occur. At the beginning and end of the run, the CW is more prominent. Also, source 2-CW is selected more often at the beginning and source 1-CW at the end, in accordance with the target's Doppler presented to the respective sources as it moves along its track.

Example 2

With False Alarms

Figure 9:
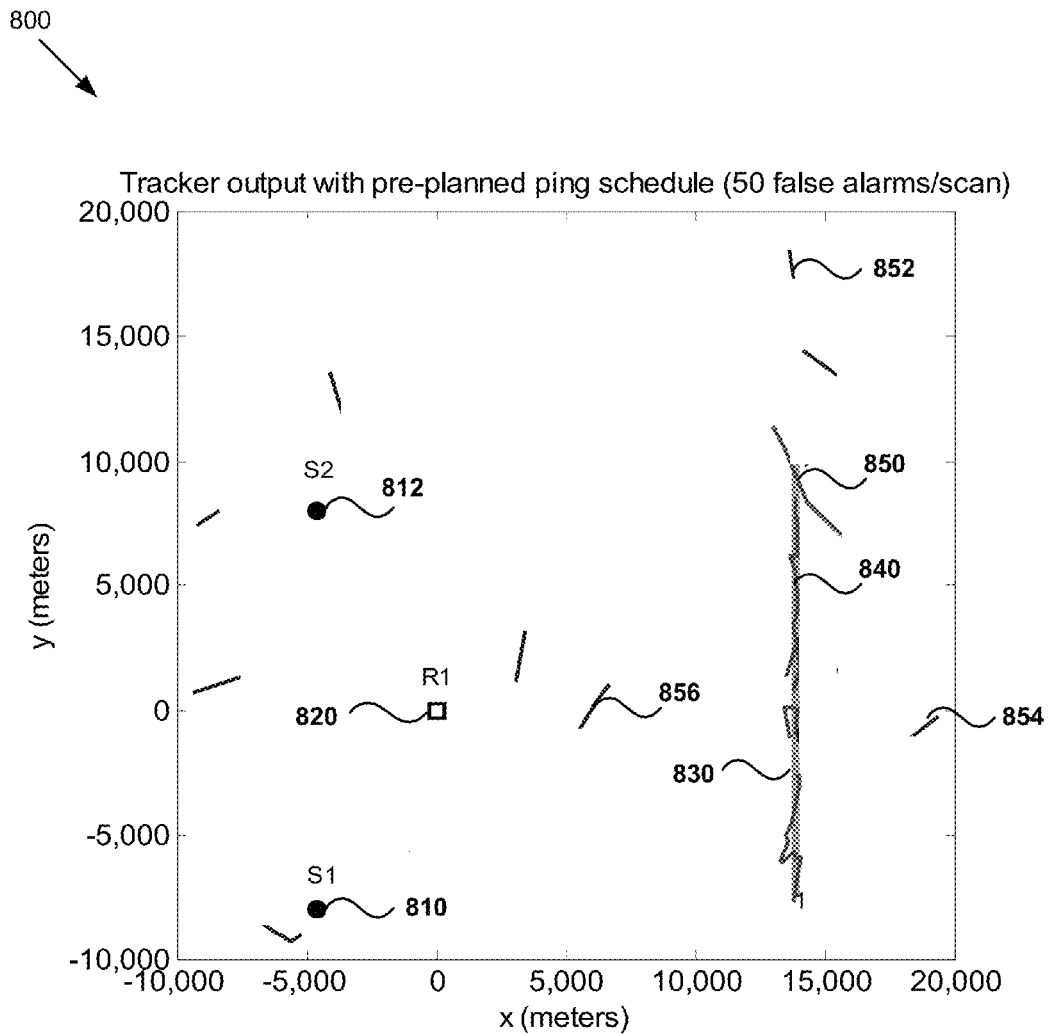
FIG. 9 shows a graph illustrating simulated tracking results using a pre-planned ping schedule and false alarms.
Figure 10:
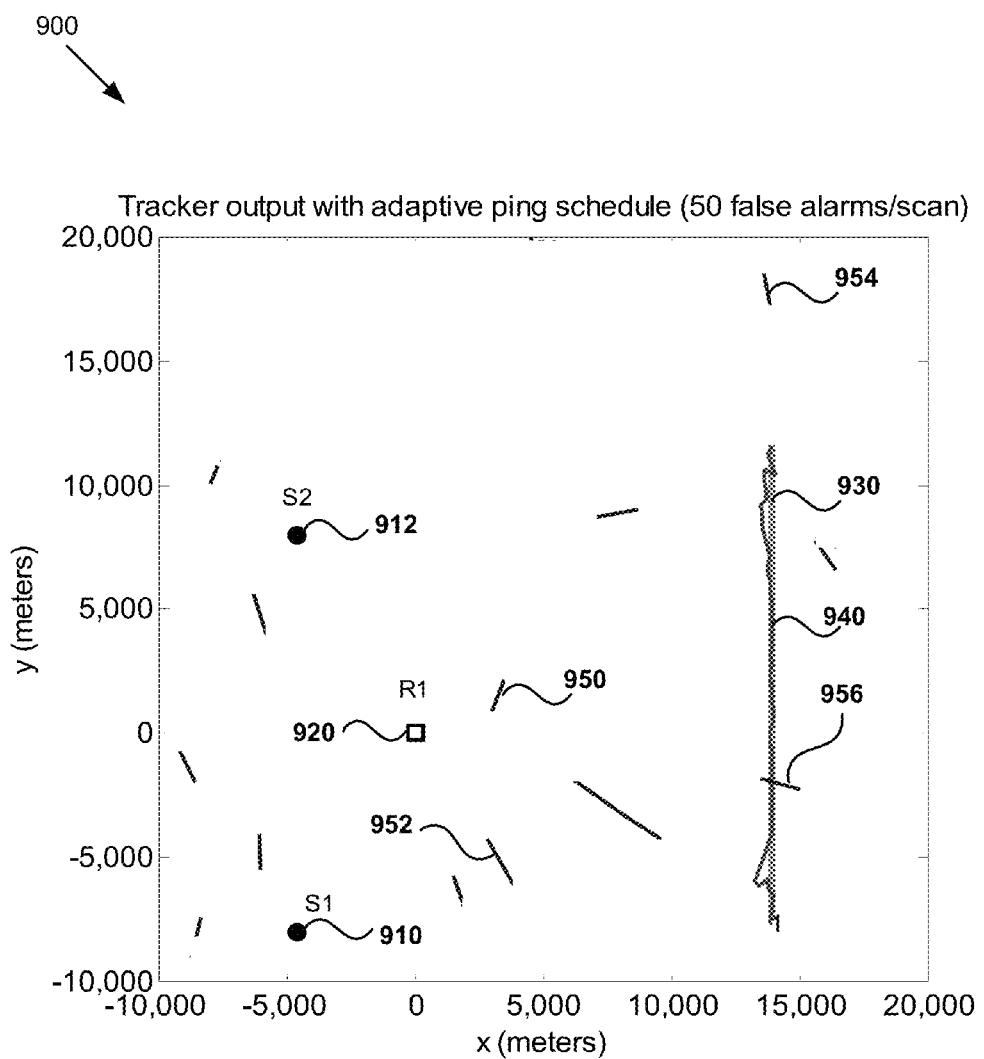
FIG. 10 shows a graph illustrating simulated tracking results using an adaptive ping schedule and false alarms, in accordance with the Adaptive Ping Control Method for Track-Holding in Multi-Static Active Sonar Networks.

In this example, the same scenario is simulated with the same parameters as described in the previous example, except 50 false alarms are generated per scan for both FM and CW pings. The simulation results are shown in FIGS. 9-12. FIG. 9 shows a graph 800 illustrating simulated tracking results using a pre-planned ping schedule, while FIG. 10 shows a graph 900 illustrating simulated tracking results using an adaptive ping schedule. In FIG. 9, there are two sources 810 and 812 and one receiver 820, whose positions are stationary. In FIG. 10, there are two sources 910 and 912 and one receiver 920, whose positions are stationary. In both FIGS. 9 and 10, a target of interest is heading north with a constant speed of 5 knots, as shown by true track 830 in FIGS. 9 and 930 in FIG. 10.

The adaptive ping schedule example of FIG. 9 results in fragmented target tracks 840, 850, and false tracks, including false tracks 852, 864 and 856. The adaptive ping schedule example of FIG. 10 results in a non-fragmented target track 940, along with false tracks, including false tracks 950, 952, 954, and 956. As shown, target track 940 more-closely follows true track 930 than target tracks 840 follow true track 830. Even with false tracks, the adaptive ping schedule scheme results in the continuous holding of the target track, although the second specular opportunity is only partially captured. This may be contributed by a number of factors such as the accuracy of target tracker predicted state estimates, data association error due to false alarms, missed detections due to SNR fluctuations and the sizing of ping time sampling intervals. For more realistic and challenging scenarios, the algorithm is expected to provide additional improvement in track-hold time, along with the tracker's fragmentation reduction.

Figure 11:
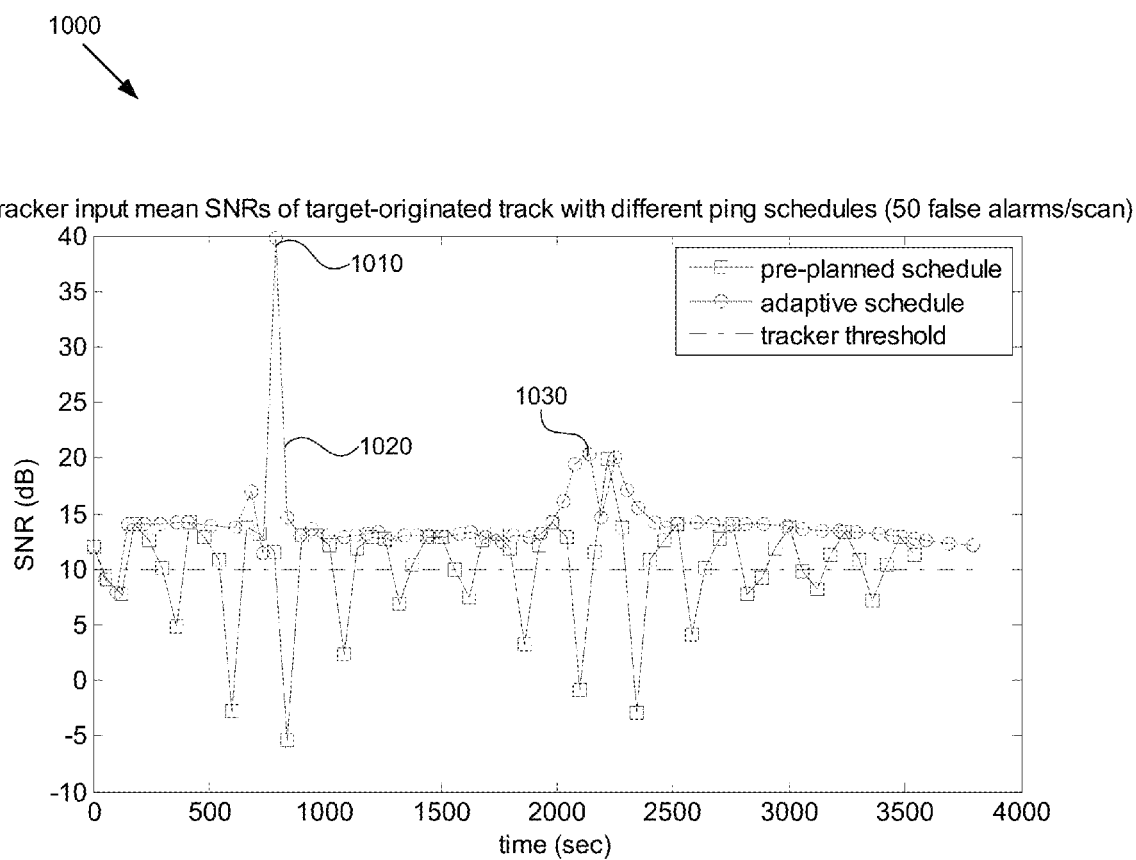
FIG. 11 shows a graph illustrating a comparison of the tracker input mean signal-to-noise ratios from a pre-planned ping schedule and the adaptive ping schedule, with false alarms.

FIG. 11 shows a graph 1000 illustrating mean SNR of a true target generated by two sources and a waveform combination. The first specular opportunity 1010 occurs at about 890 sec and is detected using the adaptive schedule 1020, while the second specular opportunity 1030 occurs at about 2170 sec and is only partially detected using the adaptive schedule or pre-planned schedule.

Figure 12:
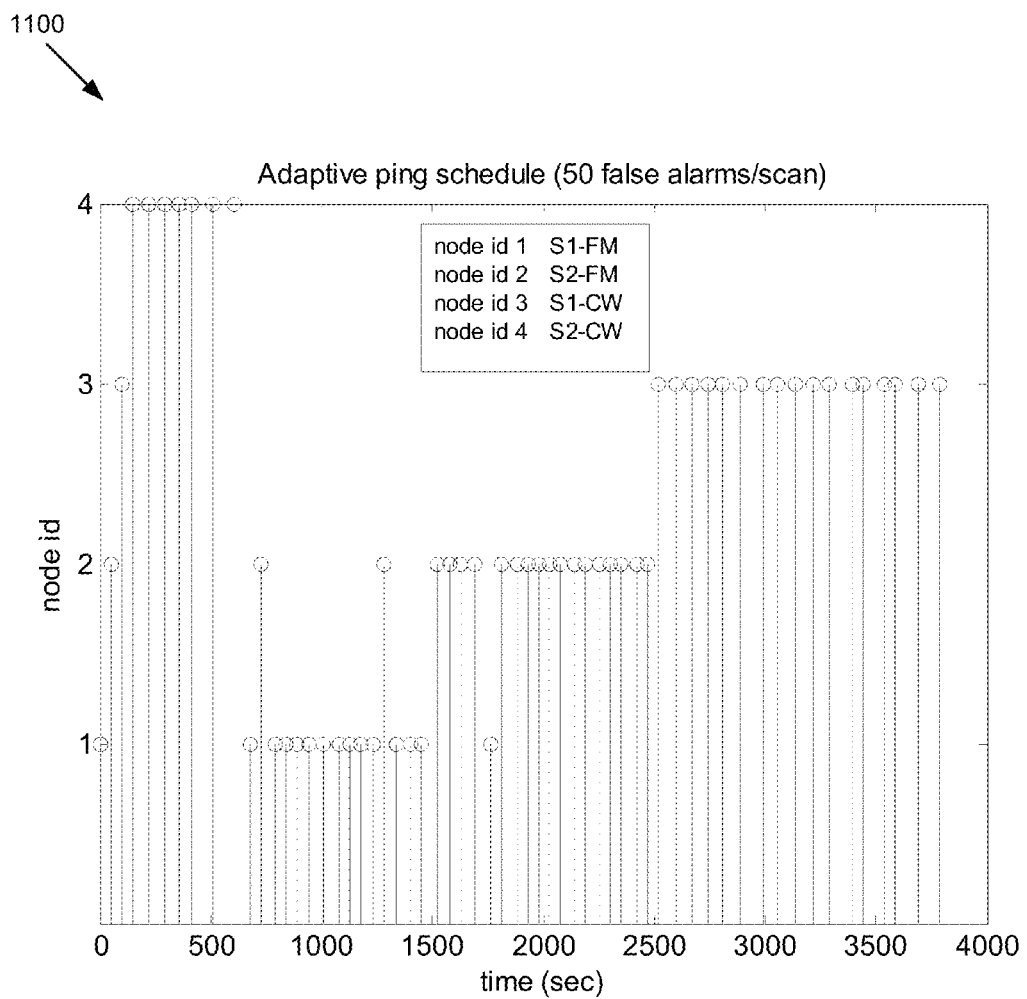
FIG. 12 shows a graph illustrating an adaptive ping schedule for a false alarm case, in accordance with the Adaptive Ping Control Method for Track-Holding in Multi-Static Active Sonar Networks.

FIG. 12 shows a graph 1100 illustrating an adaptive ping schedule for the false alarm case. Graph 1100 illustrates different combinations of waveform and source selected as a function of ping time. The FM waveform is more often selected during the middle of the run, including the period when the specular detections occur. At the beginning and end of the run, the CW is more prominent. Also, source 2-CW is selected more often at the beginning and source 1-CW at the end, in accordance with the target's Doppler presented to the respective sources as it moves along its track.

Figure 13:
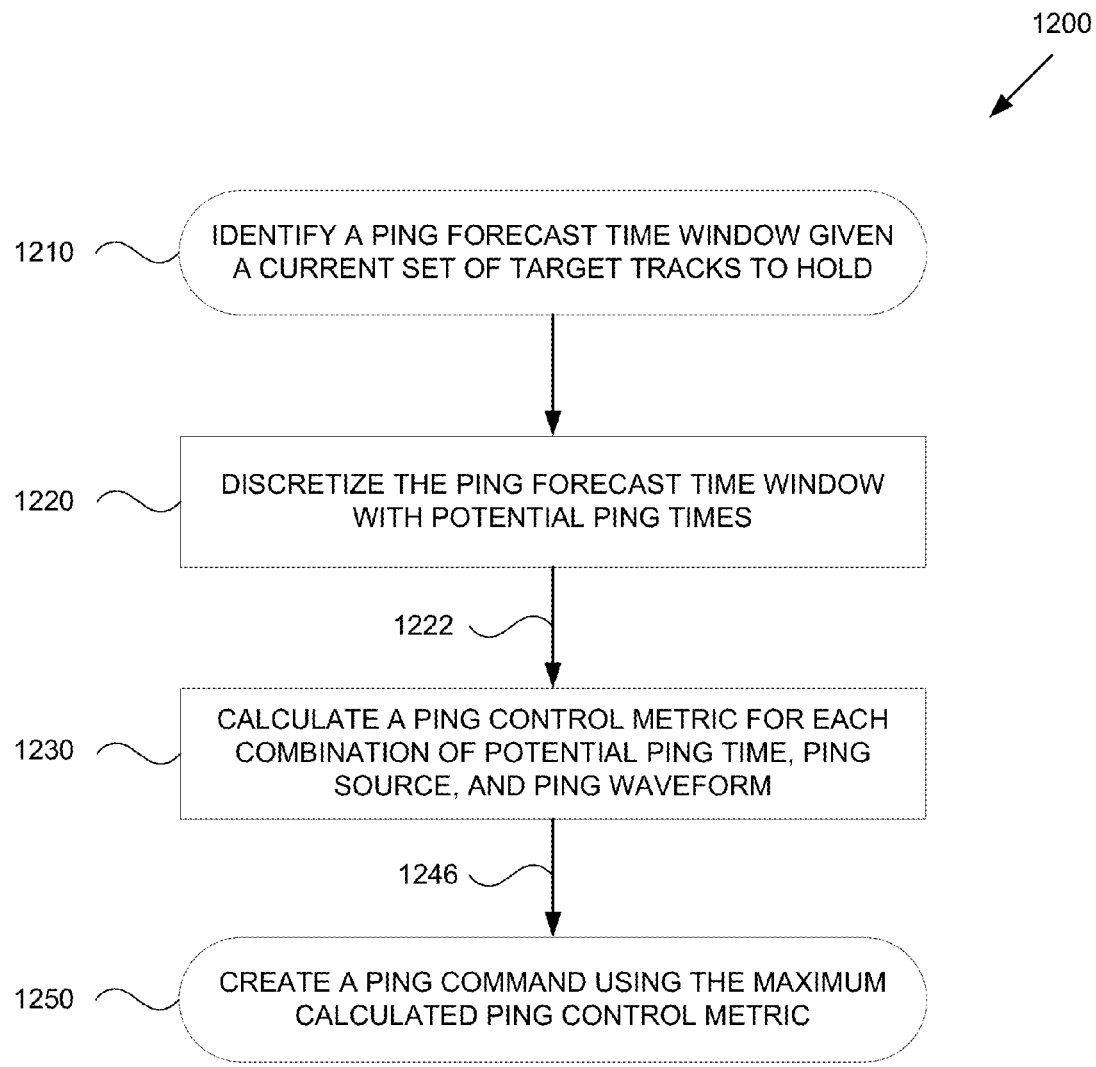
FIG. 13 shows a flowchart of an embodiment of a method in accordance with the Adaptive Ping Control Method for Track-Holding in Multi-Static Active Sonar Networks.

FIG. 13 shows a flowchart of an embodiment of a method 1200 in accordance with the Adaptive Ping Control Method for Track-Holding in Multi-Static Active Sonar Networks. As an example, some or all of the steps of method 1200 may be performed by ping control generator 50 shown in FIG. 1. Method 1200 may begin at step 1210, which involves identifying a ping forecast time window given a current set of target tracks for holding. In some embodiments, the ping control metric is a user-defined metric that is a function of predicted mean SNR or signal excess and predicted track estimates. In some embodiments, the probability of detection metric may be used, which is a function of mean SNR and track estimate and it accounts for the SNR fluctuations. The more than one ping waveform may include Doppler-sensitive waveforms, such as continuous wave (CW) and sinusoidal frequency modulation (SFM), and Doppler-insensitive waveforms, such as hyperbolic frequency modulation (HFM).

Step 1220 then involves discretizing the ping forecast time window with more than one potential ping time. Step 1220 may be performed in accordance with the discussion with reference to FIG. 3. Next, method 1200 may proceed along flow path 1222 to step 1230, which involves calculating, given more than one ping source and more than one ping waveform, a ping control metric for each combination of potential ping time, ping source, and ping waveform. Step 1230 is explained in more detail with reference to FIG. 14.

Method 1200 may then proceed along flow path 1246 to step 1250, which involves creating a ping command using the maximum calculated ping control metric. The ping command comprises a specific ping source from the more than one ping source, a specific ping waveform from the more than one ping waveform, and a specific ping time from the more than one potential ping time. As an example, the ping command may be to ping source 2 with an HFM waveform at 90 seconds from the most recent ping time.

Step 1250 includes maximizing the ping control metric as a weighted sum of the ping control metrics for all the selected tracks for holding for each combination of potential ping time, ping source, and ping waveform, and selecting the combination with the maximum calculated ping control metric according to the equation $$\mathrm{argmax}_{u_p} \Sigma_{q=1}^{NT} \beta_k^q \cdot H^q(u_p).  \quad\quad\quad \text{(Eq. 13)}$$

In some embodiments of step 1250, the ping control metric is calculated as the maximum probability of detection with respect to receivers corresponding to each target track in accordance with equation (11). In some embodiments, an alternative ping control metric may be used, which is calculated as the average probability of detection with respect to receivers as described by $$H^q(u_p) = \Sigma_j^{N_R} h_q(u_p, R_j)/N_R  \quad\quad\quad \text{(Eq. 14)}$$

where $N_R$ is the number of receivers under consideration.

Figure 14:
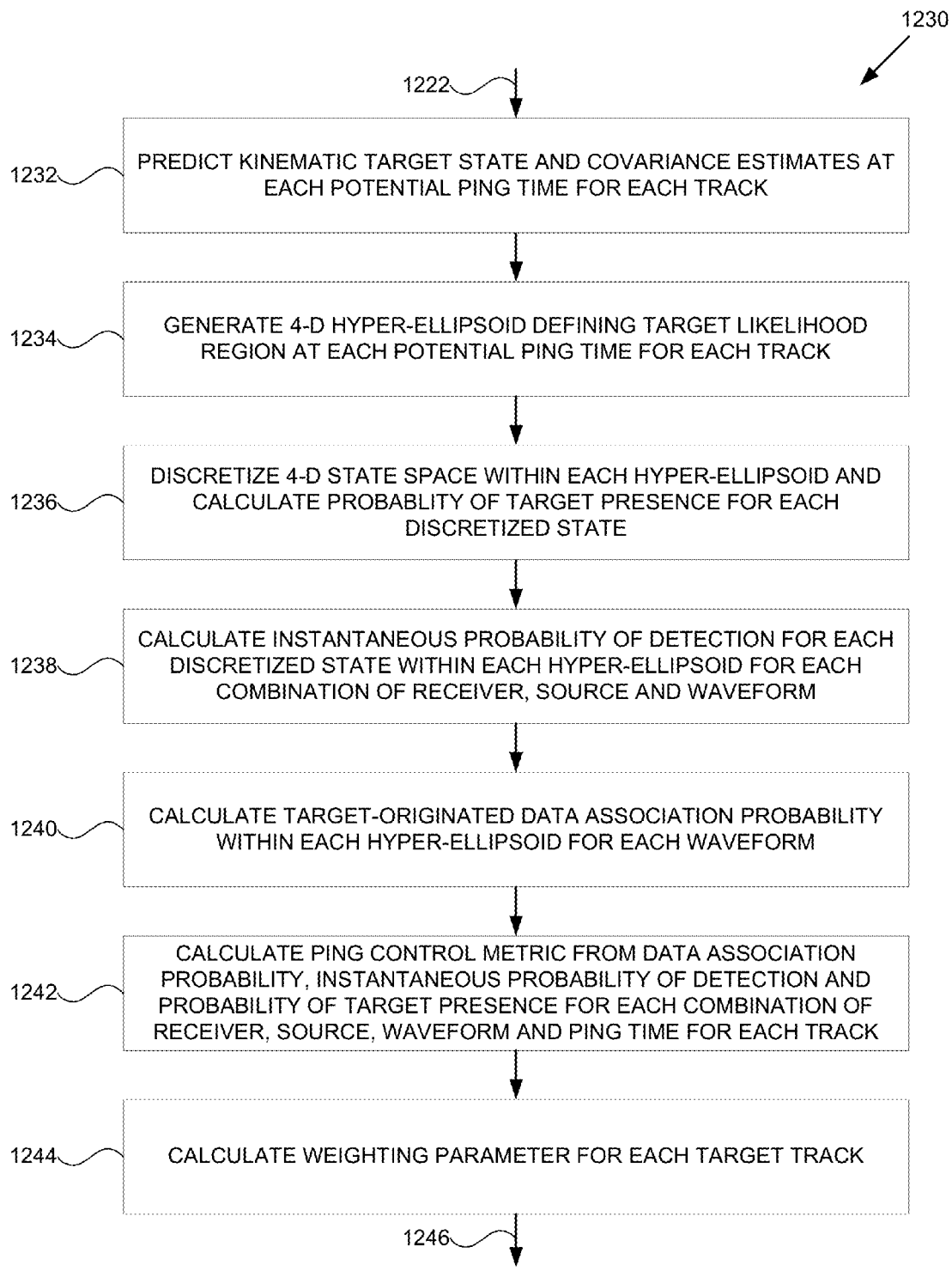
FIG. 14 shows a flowchart of an embodiment of a step for calculating a ping control metric in accordance with the Adaptive Ping Control Method for Track-Holding in Multi-Static Active Sonar Networks.

FIG. 14 shows a flowchart of an embodiment of step 1230 of method 1200. Step 1230 may begin at step 1232, which involves predicting kinematic target state and covariance estimates at each of the more than one potential ping times for each track of the set of tracks for holding. The prediction in step 1232 may be performed using equations (1) and (2) shown above.

Step 1234 may then involve generating four-dimensional (4-D) hyper-ellipsoids defining regions of possible target states at potential ping times at a pre-specified confidence level. The ellipsoid associated with each track q at each potential ping time $t_p$ is described by the estimate $X^q(p|k)$, eigenvalues and eigenvectors of the covariance matrix $P^q(p|k)$ and a prescribed constant probability parameter $\alpha$.

Step 1230 may then proceed to step 1236, which involves discretizing a 4-D state space within each hyper-ellipsoid and calculating a probability target presence with respect to each discretized state via the probability density function of the normal distribution defined by the mean and covariance estimates corresponding to each track. The calculation in step 1236 may be performed in accordance with equation (5) above.

Next, step 1238 may involve calculating an instantaneous probability of detection via a performance prediction model corresponding to each discretized state within each hyper-ellipsoid for each combination of receiver, source and waveform. Step 1238 may be performed using equation (6) shown above.

Step 1240 then involves calculating a target-originated data association probability of a multi-static target tracker associated with each hyper-ellipsoid for a given false alarm rate of the specific ping waveform. Step 1240 may be performed in accordance with equations (7-9) from above.

Step 1230 may then proceed to step 1242, which involves calculating the ping control metric corresponding to each combination of receiver, source, waveform, and ping time and for each track by multiplying the target-originated data association probability and an average instantaneous probability of detection corresponding to each hyper-ellipsoid and each receiver, source, waveform combination. The average instantaneous probability of detection over each hyper-ellipsoid is calculated as the weighted sum of the instantaneous probability of detection over all the discretized states over the hyper-ellipsoid, where weights correspond to the probabilities of target presence at each discretized state. Step 1242 may be performed in accordance with equation (4).

Step 1244 involves calculating a weighting parameter for each track in the track set selected for holding. The calculation of the weighting parameters may be performed in accordance with equation (12).

Method 1200 may be implemented as a series of modules, either functioning alone or in concert, with physical electronic and computer hardware devices. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine recordable media. Method 1200 may be implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Adaptive Ping Control Method for Track-Holding in Multi-Static Active Sonar Networks are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
   using a ping control generator, generating a ping command by
       identifying a ping forecast time window given a current set of target tracks to hold,
       discretizing the ping forecast time window with more than one potential ping time,
       calculating, given more than one ping source and more than one ping waveform, a ping control metric for each combination of potential ping time, ping source, and ping waveform, and
   creating the ping command using the maximum calculated ping control metric, the ping command comprising a combination of a specific ping source from the more than one ping source, a specific ping waveform from the more than one ping waveform, and a specific ping time from the more than one potential ping time; and
   transmitting the ping command to the specific ping source.

2. The method of claim 1, wherein the ping control metric is a user-defined metric that is a function of predicted signal-to-noise ratios and predicted target state estimates.

3. The method of claim 1, wherein the ping control metric contains aspect dependent target strength and target position and velocity data for a particular potential ping time.

4. The method of claim 1, wherein the more than one ping waveform includes Doppler-sensitive waveforms and Doppler-insensitive waveforms.

5. The method of claim 1, wherein the step of calculating a ping control metric for each combination of potential ping time, ping source, and ping waveform comprises predicting kinematic target state estimates, including position and velocity, and covariance estimates at each of the more than one potential ping times for each target track of the set of target tracks to hold.

6. The method of claim 5, wherein the step of calculating a ping control metric for each combination of potential ping time, ping source, and ping waveform further comprises generating four-dimensional hyper-ellipsoids defining regions of possible target states at potential ping times at a pre-specified confidence level from the predicted kinematic target state and covariance estimates.

7. The method of claim 6, wherein the step of calculating a ping control metric for each combination of potential ping time, ping source, and ping waveform further comprises the steps of:
   discretizing a four-dimensional position and velocity state space within the hyper-ellipsoid corresponding to each potential ping time for each target track;
   calculating a probability of each discretized four-dimensional position and velocity state via the probability density function of the normal distribution defined by the target state and the covariance estimates corresponding to each potential ping time for each target track;
   calculating an instantaneous probability of detection via a performance prediction model corresponding to each discretized state of each hyper-ellipsoid for each source-receiver-waveform combination;
   calculating a target-originated data association probability of a multi-static target tracker for a given false alarm rate of the specific ping waveform for each waveform corresponding to each hyper-ellipsoid; and
   calculating the ping control metric by multiplying the target-originated data association probability and an average instantaneous probability of detection corresponding to each hyper-ellipsoid and each source-receiver-waveform combination, wherein the average instantaneous probability of detection is calculated as the weighted sum of the instantaneous probability of detection over all the discretized four-dimensional position and velocity states within the hyper-ellipsoid where weights correspond to the probabilities of the discretized four-dimensional position and velocity states.

8. The method of claim 1, wherein the step of calculating a ping control metric for each combination of potential ping time, ping source, and ping waveform is described by the equation $h^q(u_p, R_j) = P_A(u_p) \cdot \Sigma_{i=1}^{N_p^q}(P_D(X_i^q(u_p), R_j) \cdot P_T(X_i^q(u_p)))$, where $h^q(u_p, R_j)$ represents the probability that track q will be detected by receiver $R_j$ and the tracker will associate the detection by receiver $R_j$ to track q if ping command $u_p$ (a combination of potential ping time, ping source, and ping waveform) is activated, $N_p^q$ represents the total number of grid cells in the hyper-ellipsoid at ping time $t_p$ corresponding to ping command $u_p$ for track q, $P_T(X_i^q(u_p))$ describes the probability that the target state is $X_i^q$ at ping time $t_p$ corresponding to ping command $u_p$ for track q, $P_D(X_i^q(u_p), R_j)$ is the probability of detection at the tracker input corresponding to receiver $R_j$ if the target state is $X_i^q$ and ping command $u_p$ is activated, $P_A(u_p)$ is the probability of tracker association of a target-originated detection if ping command $u_p$ is activated for a given false alarm rate.

9. The method of claim 1, wherein the step of creating a ping command using the maximum calculated ping control metric includes the step of selecting the maximum calculated ping control metric from the ping control metrics calculated with respect to receivers corresponding to each potential ping command for each target track as described by the equation $H^q(u_p) = \max_{R_j} h_q(u_p, R_j)$.

10. The method of claim 1, wherein the step of creating a ping command using the maximum calculated ping control metric comprises the steps of:
    maximizing the ping control metric as a weighted sum of the ping control metrics for all the selected tracks for holding for each possible ping command; and
    selecting the combination with the maximum calculated ping control metric according to the equation $\mathrm{argmax}_{u_p} \Sigma_{q=1}^{N_T} \beta_k^q \cdot H^q(u_p)$, where $N_T$ is the number of selected tracks for holding, $\beta_k^q$ is the weighting parameter for each active track q at the current ping time $t_k$, $H^q(u_p)$ is the ping control metric with respect to each possible ping command $u_p$ for track q.

11. A system comprising:
    more than one ping source and more than one receiver, wherein the ping source is configured to select a ping waveform from more than one available ping waveform;
    a ping control generator configured to generate and transmit active ping commands to the more than one ping source;
    a multi-static target tracker configured to generate and transmit current and future kinematic target state and covariance estimates to the ping control generator; and a sonar performance model configured to calculate ping control metrics that are a function of signal-to-noise ratios for given target-source-receiver states, wherein the ping control generator generates active ping commands that enhance the detection opportunity of high-strength specular echoes by simultaneously selecting the combination of potential ping time, ping source, and ping waveform corresponding to a maximum calculated ping control metric.

12. The system of claim 11, wherein the multi-static target tracker is a centralized Kalman-Filter based target tracker.

13. The system of claim 11, wherein the sonar performance model is a bi-static sonar performance model based on an active sonar equation.

14. The system of claim 11, wherein the sonar performance model contains aspect dependent target strength and target position and velocity data.

15. A non-transitory computer-readable storage medium having a method encoded thereon, the method represented by computer-readable programming code, the method comprising the steps of:

identifying a ping forecast time window given a current set of target tracks to hold;

discretizing the ping forecast time window with more than one potential ping time;

calculating, given more than one ping source and more than one ping waveform, a ping control metric for each combination of potential ping time, ping source, and ping waveform; and creating a ping command using the maximum calculated ping control metric, the ping command comprising a combination of a specific ping source from the more than one ping source, a specific ping waveform from the more than one ping waveform, and a specific ping time from the more than one potential ping time.

16. The non-transitory computer-readable storage medium of claim 15, wherein the step of calculating a ping control metric for each combination of potential ping time, ping source, and ping waveform comprises predicting kinematic target state and covariance estimates at each of the more than one potential ping times for each target track of the set of target tracks selected for holding.

17. The non-transitory computer-readable storage medium of claim 16, wherein the step of calculating a ping control metric for each combination of potential ping time, ping source, and ping waveform further comprises generating four-dimensional hyper-ellipsoids defining regions of possible target states at potential ping times at a pre-specified confidence level from the predicted kinematic target state and covariance estimates.

18. The non-transitory computer-readable storage medium of claim 17, wherein the step of calculating a ping control metric for each combination of potential ping time, ping source, and ping waveform further comprises the steps of:

discretizing a four-dimensional position and velocity state space within the hyper-ellipsoid corresponding to each potential ping time for each target track;

calculating a probability of each discretized four-dimensional position and velocity state via the probability density function of the normal distribution defined by the target state and the covariance estimates corresponding to each potential ping time for each target track;

calculating an instantaneous probability of detection via a performance prediction model corresponding to each discretized state of each hyper-ellipsoid for each source-receiver-waveform combination;

calculating a target-originated data association probability of a multi-static target tracker for a given false alarm rate of the specific ping waveform for each waveform corresponding to each hyper-ellipsoid; and calculating the ping control metric by multiplying the target-originated data association probability and an average instantaneous probability of detection corresponding to each hyper-ellipsoid and each source-receiver-waveform combination, wherein the average instantaneous probability of detection is calculated as the weighted sum of the instantaneous probability of detection over all the discretized four-dimensional position and velocity states within the hyper-ellipsoid where weights correspond to the probabilities of the discretized four-dimensional position and velocity states.

19. The non-transitory computer-readable storage medium of claim 15, wherein the step of creating a ping command using the maximum calculated ping control metric comprises the steps of:

maximizing the ping control metric as a weighted sum of the ping control metrics for all the selected tracks for holding for each possible ping command; and selecting the combination with the maximum calculated ping control metric according to the equation $\mathrm{argmax}_{u_p} \Sigma_{q=1}^{N_T} \beta_k^q \cdot H^q(u_p)$, where $N_T$ is the number of selected tracks for holding, $\beta_k^q$ is the weighting parameter for each active track q at the current ping time $t_k$, $H^q(u_p)$ is the ping control metric with respect to each possible ping command $u_p$ for track q.

* * * * *